United States Patent
Igawa et al.

(10) Patent No.: US 10,698,098 B2
(45) Date of Patent: Jun. 30, 2020

(54) MILLIMETER WAVE RADAR AND MILLIMETER WAVE RADAR DETECTION METHOD

(71) Applicant: TAIYO YUDEN CO., LTD., Tokyo (JP)

(72) Inventors: Izumi Igawa, Tokyo (JP); Ryuichi Sunagawa, Tokyo (JP); Yutaka Aoki, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 246 days.

(21) Appl. No.: 15/718,892

(22) Filed: Sep. 28, 2017

(65) Prior Publication Data
US 2018/0088227 A1 Mar. 29, 2018

(30) Foreign Application Priority Data

Sep. 29, 2016 (JP) ................................. 2016-191674

(51) Int. Cl.
| | |
|---|---|
| *G01S 13/58* | (2006.01) |
| *G01S 13/62* | (2006.01) |
| *G01S 13/18* | (2006.01) |
| *G01S 13/00* | (2006.01) |

(52) U.S. Cl.
CPC ............ *G01S 13/581* (2013.01); *G01S 13/18* (2013.01); *G01S 13/62* (2013.01)

(58) Field of Classification Search
CPC ........ G01S 13/581; G01S 13/18; G01S 13/62; G01S 13/58
See application file for complete search history.

(56) References Cited

U.S. PATENT DOCUMENTS

| | | | | |
|---|---|---|---|---|
| 3,794,992 A | * | 2/1974 | Gehman | G01S 1/02 342/28 |
| 3,990,076 A | * | 11/1976 | Naidich | G01S 13/449 342/91 |
| 4,017,854 A | * | 4/1977 | Ross | G01S 13/42 342/21 |
| 4,086,590 A | * | 4/1978 | Goggins, Jr. | G01S 13/4481 342/149 |
| 4,257,047 A | * | 3/1981 | Lipsky | G01S 5/04 342/154 |

(Continued)

FOREIGN PATENT DOCUMENTS

| | | |
|---|---|---|
| JP | S63-144222 A | 6/1988 |
| JP | 2003-139845 A | 5/2003 |
| JP | 2013-156794 A | 8/2013 |

OTHER PUBLICATIONS

Japanese Office Action dated Dec. 3, 2019, in a counterpart Japanese patent application No. 2016-191674. (A machine translation (not reviewed for accuracy) attached.).

*Primary Examiner* — Bernarr E Gregory
(74) *Attorney, Agent, or Firm* — Chen Yoshimura LLP

(57) ABSTRACT

A millimeter wave radar includes an antenna unit including a plurality of antennas that receive millimeter waves, each of the antennas having a prescribed reception range from which the millimeter waves are incident on the antenna; and a signal processing unit that detects, on the basis of a difference between outputs of the plurality of antennas that have received millimeter waves, a moving object moving across the reception ranges of the plurality of antennas.

12 Claims, 24 Drawing Sheets

(56) References Cited

U.S. PATENT DOCUMENTS

| | | | | |
|---|---|---|---|---|
| 4,305,074 | A | * | 12/1981 | Barzana ................. G01S 13/42 |
| | | | | 342/100 |
| 4,608,566 | A | * | 8/1986 | Ennis ..................... G01S 13/32 |
| | | | | 342/149 |
| 5,274,389 | A | * | 12/1993 | Archer .................. H01Q 3/242 |
| | | | | 342/437 |
| 6,680,691 | B2 | * | 1/2004 | Hager .................... G01S 7/292 |
| | | | | 342/118 |
| 7,170,441 | B2 | * | 1/2007 | Perl ......................... G01S 5/12 |
| | | | | 342/126 |
| 7,508,343 | B1 | * | 3/2009 | Maloratsky ........... H01Q 3/242 |
| | | | | 342/374 |
| 2003/0107528 | A1 | | 6/2003 | Takemoto et al. |
| 2004/0027276 | A1 | * | 2/2004 | Herman ................. G01S 5/06 |
| | | | | 342/181 |
| 2009/0009380 | A1 | * | 1/2009 | Schnitzer .............. G01S 7/282 |
| | | | | 342/90 |
| 2013/0194127 | A1 | | 8/2013 | Ishihara et al. |

* cited by examiner (A+B)-(C+D)

(A+D)-(B+C)

(A+B)-(C+D)

(A+D)-(B+C)

(A+B)-(C+D)

(A+D)-(B+C)

MILLIMETER WAVE RADAR AND MILLIMETER WAVE RADAR DETECTION METHOD

BACKGROUND OF THE INVENTION

Technical Field

The present invention relates to a millimeter wave radar and a millimeter wave radar detection method for measuring distances using millimeter waves.

Background Art

Millimeter waves (electromagnetic waves with a wavelength of 1 mm to 10 mm) are used in water level measurements, wireless access communications, image transmission systems, convenience radio, automobile collision prevention radar, and the like. In conventional millimeter wave sensors, moving objects such as people or automobiles that pass through the detection range create an external disturbance that is difficult to reject.

Meanwhile, Patent Document 1 discloses a vehicle collision hazard prediction device that uses millimeter waves. In this device, a large number of millimeter wave receiving antennas are arranged two-dimensionally to make it possible to detect moving objects.

RELATED ART DOCUMENT

Patent Document

Patent Document 1: Japanese Patent Application Laid-Open Publication No. 2013-156794

SUMMARY OF THE INVENTION

However, in the configuration in Patent Document 1, a large number (several dozen or more) of the millimeter wave receiving antennas need to be arranged two-dimensionally, which makes the device large in size and high in cost.

In light of the foregoing, an objective of the present invention relates to a millimeter wave radar and a millimeter wave radar detection method that make it possible to detect a moving object in a simple manner. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure a millimeter wave radar, including: an antenna unit including a plurality of antennas that receive millimeter waves, each of the antennas having a prescribed reception range from which the millimeter waves are incident on the antenna; and a signal processing unit that detects, on the basis of a difference between outputs of the plurality of antennas that have received millimeter waves, a moving object moving across the reception ranges of the plurality of antennas This configuration makes it possible to detect a moving object on the basis of the difference between a plurality of millimeter wave antenna outputs, thereby making it possible to reject external noise due to the moving object in a low-cost manner.

When an output of any of the plurality of antennas exceeds a threshold value, the signal processing unit may reject the output of the antenna whose output exceeded the threshold value.

This configuration makes it possible to reject the effects of antenna output due to the moving object, thereby making it possible to improve the accuracy of the millimeter wave radar.

The signal processing unit may estimate a movement direction or a movement speed of the moving object on the basis of the difference between the outputs of the plurality of antennas.

The position and movement in position of the moving object relative to each antenna can be inferred on the basis of the difference between the outputs of the plurality of antennas, thereby making it possible to estimate the movement direction or movement speed of the moving object.

The plurality of antennas may include four antennas, and the signal processing unit may estimate the movement direction or the movement speed of the moving object on the basis of a difference between a sum of outputs of two antennas of the four antennas and a sum of outputs of two other antennas.

Combining the outputs of each two antennas of the four antennas and then obtaining the difference of the resulting sums makes it possible to estimate the movement direction or the movement speed of the moving object.

The millimeter wave radar may further include: a transmission antenna that can transmit millimeter waves, wherein the plurality of antennas may be arranged with the transmitting antenna at a center.

The plurality of antennas may be millimeter wave receiving antennas, and the millimeter wave radar may separately include a transmitting antenna that transmits millimeter waves.

The plurality of antennas may be transmitting-receiving antennas that respectively transmit millimeter waves.

The plurality of antennas may be a transmitting-receiving antenna capable of receiving and transmitting millimeter waves.

The millimeter wave radar may further include: a separator that is arranged on the transmitting antenna so as to separate the reception ranges of the plurality of antennas from one another without overlaps therebetween.

This configuration makes it possible to prevent interference disturbances that occur due to the occurrence of the reception ranges of the plurality of antennas.

The millimeter wave radar may further include: separators that are arranged on the transmitting-receiving antenna so as to separate reception ranges of the transmitting-receiving antennas from one another without overlaps therebetween.

Even when the millimeter wave radar includes the transmitting-receiving antennas, arranging the separators on the transmitting-receiving antennas makes it possible to prevent interference disturbances.

In another aspect, the present disclosure provides a millimeter wave radar detection method, including: receiving, via a plurality of antennas, millimeter waves reflected from a measurement target object and a moving object that moves across reception ranges of the plurality of antennas, the reception ranges being defined as ranges from which millimeter waves reflected from the measurement target object are incident on the respective antennas; and detecting, on the basis of a difference between outputs of the plurality of antennas that receive millimeter waves, the moving object moving across the reception ranges of the plurality of antennas.

In another aspect, the present disclosure provides a millimeter wave radar, including: an antenna unit including a plurality of antennas that receive millimeter waves reflected from a measurement target object and a moving object that moves across reception ranges of the plurality of antennas, the reception ranges being defined as ranges from which millimeter waves reflected from the measurement target object are incident on the respective antennas; and a signal processing unit that detects the measurement target object in accordance with outputs of the plurality of antennas that have received millimeter waves reflected from the measurement target object, the signal processing unit further determining whether the moving object is moving across the reception ranges of the plurality of antennas, and if so determined, rejecting a result of the detection of the measurement target object.

As described above, at least some aspects of the present invention make it possible to provide a millimeter wave radar and a millimeter wave radar detection method that make it possible to detect a moving object in a simple manner. It is to be understood that both the foregoing general description and the following detailed description are exemplary and explanatory, and are intended to provide further explanation of the invention as claimed.

DETAILED DESCRIPTION OF EMBODIMENTS

An embodiment of the present invention will be described with reference to figures.

<Configuration of Millimeter Wave Radar>

Figure 1:
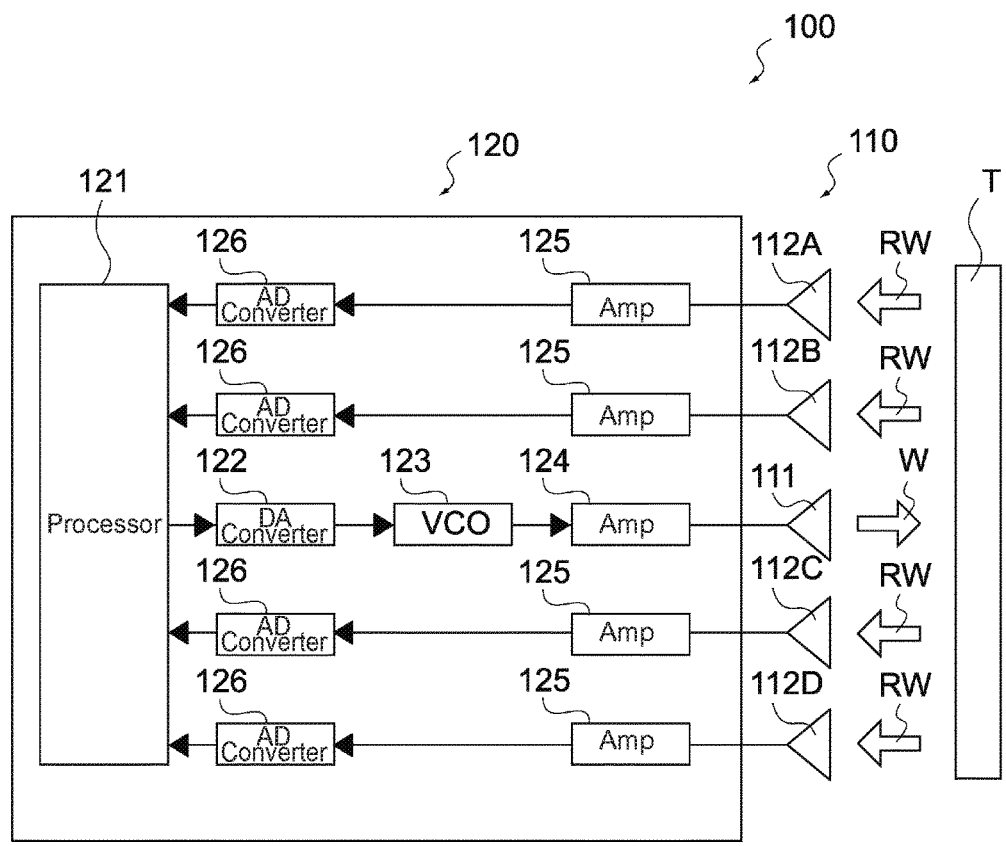
FIG. 1 is a block diagram illustrating a configuration of a millimeter wave radar according to an embodiment of the present invention.

FIG. 1 is a block diagram illustrating a configuration of a millimeter wave radar 100 according to the present embodiment. As illustrated in FIG. 1, the millimeter wave radar 100 includes an antenna unit 110 and a signal processing unit 120. FIG. 1 also depicts a target T, which is the measurement target for the millimeter wave radar 100.

The antenna unit 110 includes one transmitting antenna 111 and four receiving antennas 112. Below, the four receiving antennas (collectively referred to by a reference numeral 112) will be respectively referred to as a receiving antenna 112A, a receiving antenna 112B, a receiving antenna 112C, and a receiving antenna 112D.

The transmitting antenna 111 is an antenna capable of transmitting millimeter waves. FIG. 1 illustrates a millimeter wave W that is transmitted from the transmitting antenna 111. Although the configuration of the transmitting antenna 111 is not particularly limited, the configuration can be an antenna array in which antenna elements are arranged in an array. Moreover, the transmitting antenna 111 may include a lens that disperses the millimeter waves.

The receiving antennas 112 are antennas capable of receiving millimeter waves. FIG. 1 illustrates millimeter waves RW that the receiving antennas 112 receive. Although the configuration of the receiving antennas 112 is not particularly limited, the configuration can be an antenna array in which antenna elements are arranged in an array. Moreover, the receiving antennas 112 may include a lens that focuses the millimeter waves.

Figure 2:
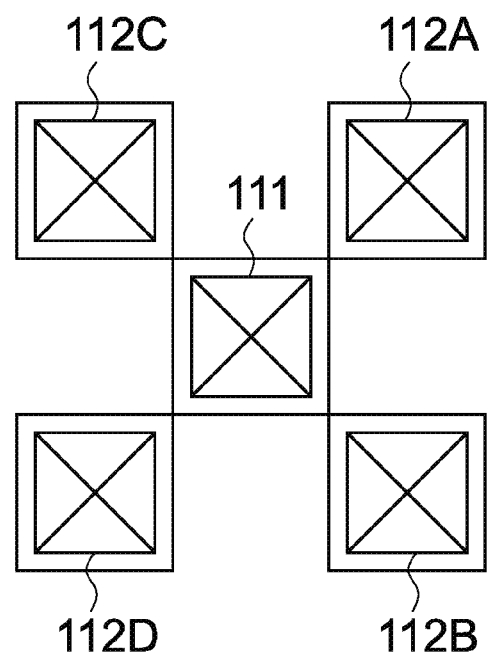
FIG. 2 schematically illustrates a radar arrangement of an antenna unit included in the millimeter wave radar.

FIG. 2 schematically illustrates the arrangement of the transmitting antenna 111 and the receiving antennas 112 in the antenna unit 110 and illustrates the antenna unit 110 as viewed from the target T direction. As illustrated in FIG. 2, the four receiving antennas 112 are arranged in a two row by two column array in the periphery of the transmitting antenna 111, with the transmitting antenna 111 at the center.

The signal processing unit 120 includes a processor 121, a DA converter 122, a VCO 123, a transmission amplifier 124, four reception amplifiers 125, and four AD converters 126.

The processor 121 is a microprocessor such as a central processing unit (CPU) which generates a millimeter wave signal (hereinafter, "transmission signal") to be transmitted from the transmitting antenna 111 and also performs signal processing on millimeter wave signals (hereinafter, "received signals") that are received by the receiving antennas 112. This will be described in more detail later.

The DA (digital-to-analog) converter 122 converts the transmission signal output from the processor 121 (which is a digital signal) to an analog signal and supplies this analog signal to the VCO 123.

The VCO (voltage-controlled oscillator) 123 receives the transmission signal supplied from the DA converter 122 and outputs and supplies a high-frequency signal in a prescribed frequency (such as 30 GHz) band to the transmission amplifier 124.

The transmission amplifier 124 amplifies the transmission signal supplied from the VCO 123 to a level necessary for transmission output and supplies the resulting signal to the transmitting antenna 111.

The reception amplifiers 125 amplify the received signals output by the receiving antennas 112 upon receiving the millimeter waves RW and supply the resulting signals to the AD converters 126. The four reception amplifiers 125 are respectively connected to the four receiving antennas 112 in a one-to-one manner.

The AD (analog-to-digital) converters 126 convert analog signals (the received signals supplied from the reception amplifiers 125) to digital signals and supply these digital signals to the processor 121. The four AD converters 126 are respectively connected to the four reception amplifiers 125 in a one-to-one manner.

The millimeter wave radar 100 has the configuration described above.

<Operation of Millimeter Wave Radar>

Figure 3:
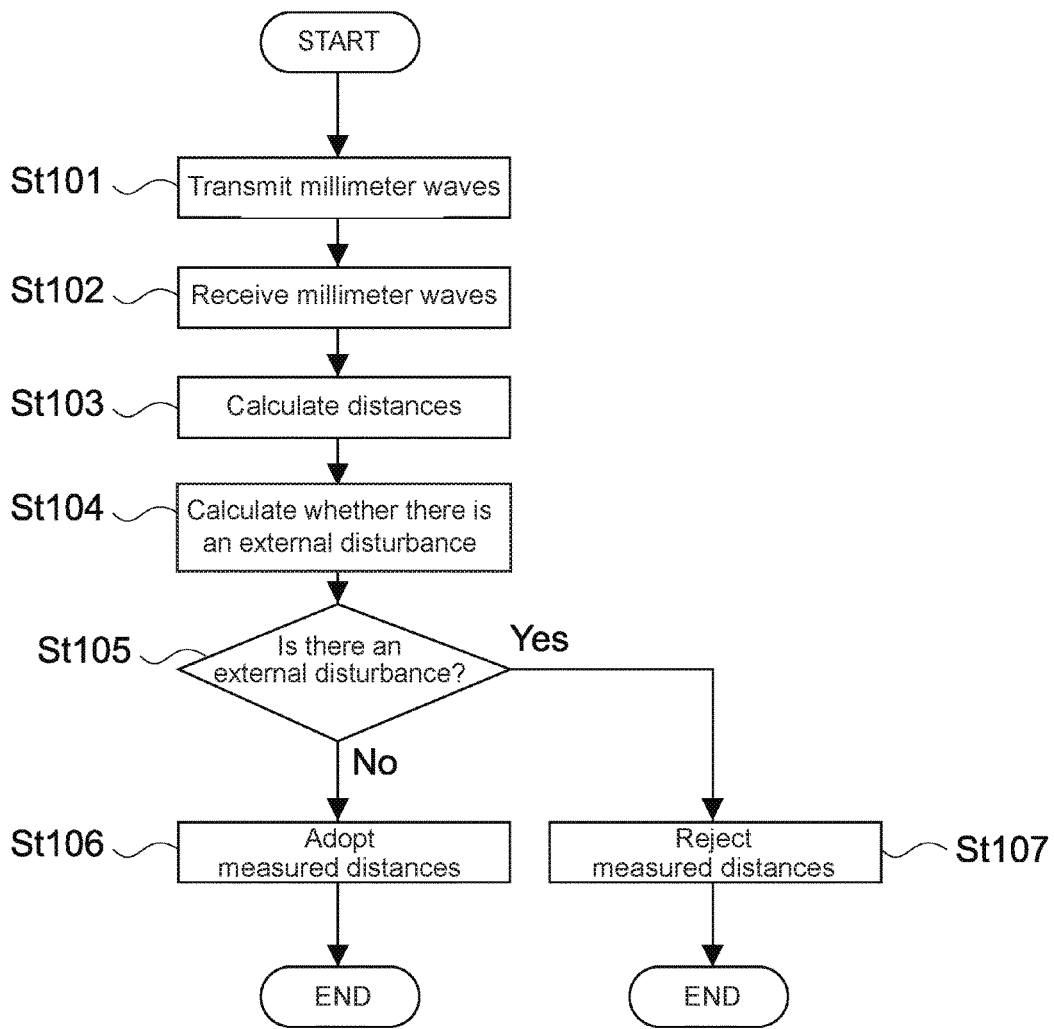
FIG. 3 is a flowchart illustrating operation of the millimeter wave radar.

Next, the operation of the millimeter wave radar 100 will be described. FIG. 3 is a flowchart illustrating the operation of the millimeter wave radar 100.

When a transmission signal is generated by the processor 121, the generated signal is supplied via the DA converter 122, the VCO 123, and the transmission amplifier 124 to the transmitting antenna 111, and the millimeter wave W is transmitted from the transmitting antenna 111 (St101).

The millimeter wave is reflected by a measurement target (such as the target T), and the four receiving antennas 112 receive the millimeter waves RW (the reflected waves) (St102). The received signals output from the receiving antennas 112 are supplied via the reception amplifiers 125 and the AD converters 126 to the processor 121.

The processor 121 calculates the distances between the respective receiving antennas 112 and the measurement target on the basis of the strengths of the received signals output from the respective receiving antennas 112.

Figure 4:
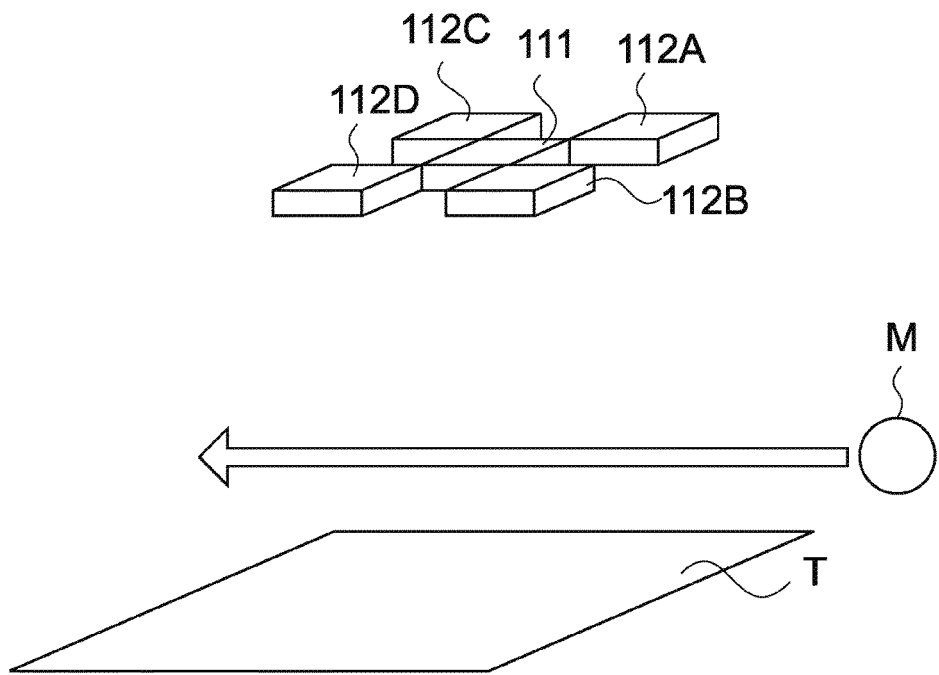
FIG. 4 schematically illustrates the positional relationship between the antenna unit of the millimeter wave radar, a target, and a moving object.

FIG. 4 schematically illustrates the positional relationship between the transmitting antenna 111, the receiving antennas 112, the target T, and a moving object M. As illustrated in FIG. 4, the four receiving antennas 112 face the target T, and normally, the millimeter wave W transmitted from the transmitting antenna 111 is reflected by the target T and received by the receiving antennas 112 as the millimeter waves RW. The target T is not particularly limited but may be the surface of water, for example.

As illustrated in FIG. 4, when the moving object M passes between the receiving antennas 112 and the target T, the millimeter wave W is reflected by the moving object M, thereby affecting the received signals of the receiving antennas 112.

Figure 5:
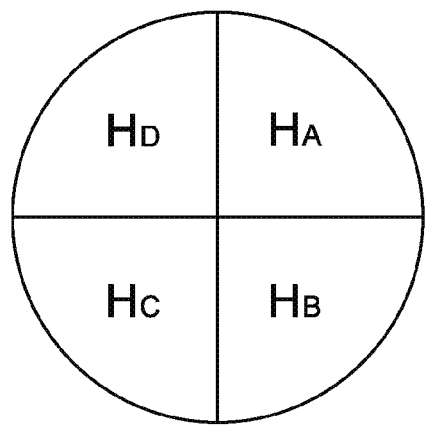
FIG. 5 schematically illustrates reception ranges of the antenna unit included in the millimeter wave radar.

FIG. 5 schematically illustrates the reception ranges of the respective receiving antennas 112. As illustrated in FIG. 5, the reception range of the receiving antenna 112A is a reception range $H_A$, the reception range of the receiving antenna 112B is a reception range $H_B$, the reception range of the receiving antenna 112C is a reception range $H_C$, and the reception range of the receiving antenna 112D is a reception range $H_D$.

Figure 6:
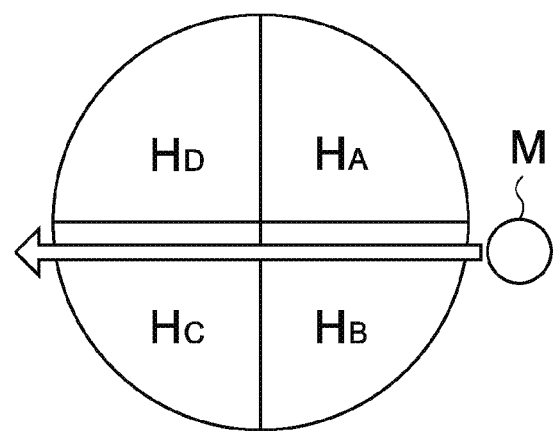
FIG. 6 schematically illustrates reception ranges of the antenna unit included in the millimeter wave radar and a movement path of a moving object.

When, as illustrated in FIG. 6, the moving object M passes through the reception range $H_B$ and the reception range $H_C$, the strengths of the received signals output by the respective receiving antennas 112 behave as illustrated in FIGS. 7A to 7D. FIGS. 7A to 7D includes graphs respectively showing the signal strengths of the received signals output from the receiving antennas 112A to 112D, where A in the figure is the output of the receiving antenna 112A, B in the figure is the output of the receiving antenna 112B, C in the figure is the output of the receiving antenna 112C, and D in the figure is the output of the receiving antenna 112D.

Figure 7A:
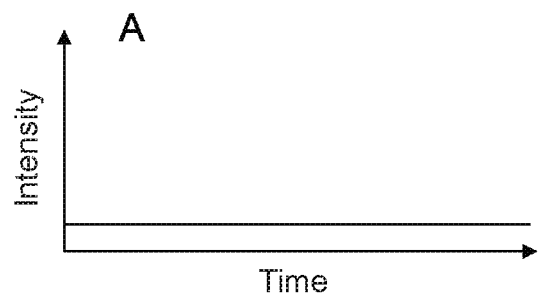
FIGS. 7A to 7D include graphs showing the signal strengths of receiving antennas included in the millimeter wave radar.
Figure 7B:
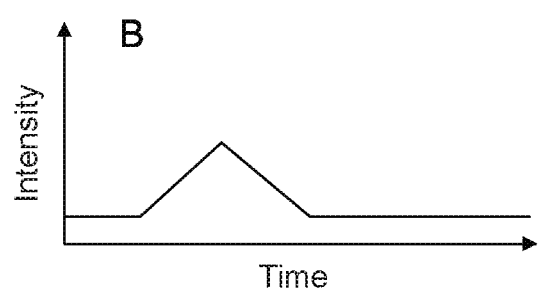
Figure 7C:
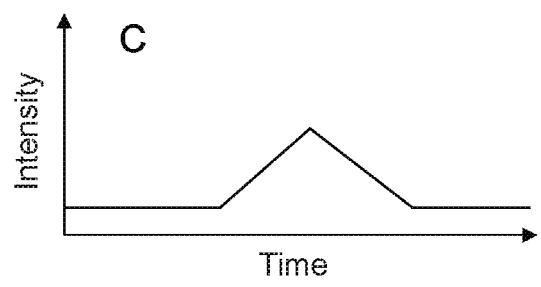
Figure 7D:
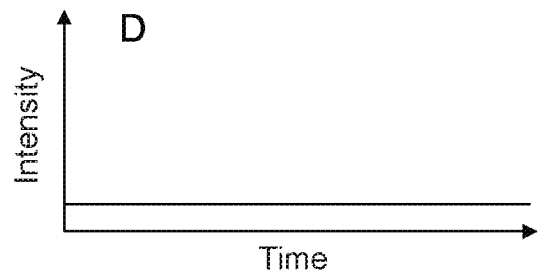
Figure 8A:
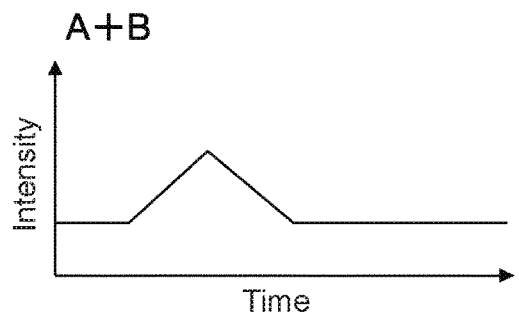
FIGS. 8A to 8D include graphs when the signal strengths of the receiving antennas included in the millimeter wave radar are combined.
Figure 8B:
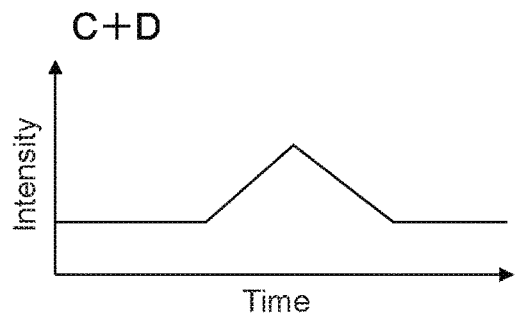
Figure 8C:
Figure 8D:
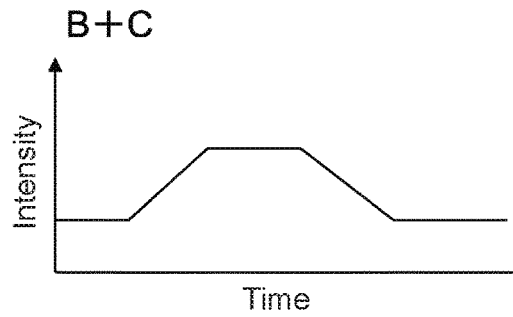

As illustrated in FIGS. 7B and 7C, the signal strengths of the receiving antenna 112B and the receiving antenna 112C exhibit peaks due to the moving object M passing by. The processor 121 calculates the distances between the respective receiving antennas 112 and the measurement target on the basis of the signal strengths of the respective receiving antennas 112.

Subsequently, the processor 121 combines the signal strengths of the respective receiving antennas 112 to calculate whether there are any effects due to the moving object M (disturbance) (St104).

FIGS. 8A to 8D include signal strength graphs in which the signal strengths of the receiving antennas 112 are combined. As illustrated in FIGS. 8A to 8D, the processor 121 calculates the sum of the signal strengths of the receiving antenna 112A and the receiving antenna 112B (A+B in the figure), the sum of the signal strengths of the receiving antenna 112C and the receiving antenna 112D (C+D in the figure), the sum of the signal strengths of the receiving antenna 112A and the receiving antenna 112D (A+D in the figure), and the sum of the signal strengths of the receiving antenna 112B and the receiving antenna 112C (B+C in the figure).

Figure 9A:
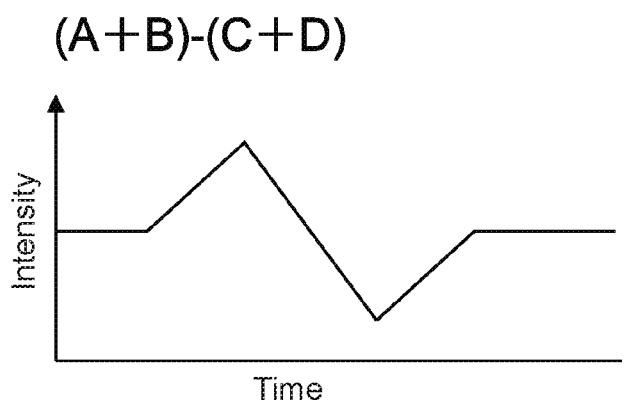
FIGS. 9A and 9B include graphs of when the signal strengths of the receiving antennas included in the millimeter wave radar are combined and then differences are calculated.
Figure 9B:
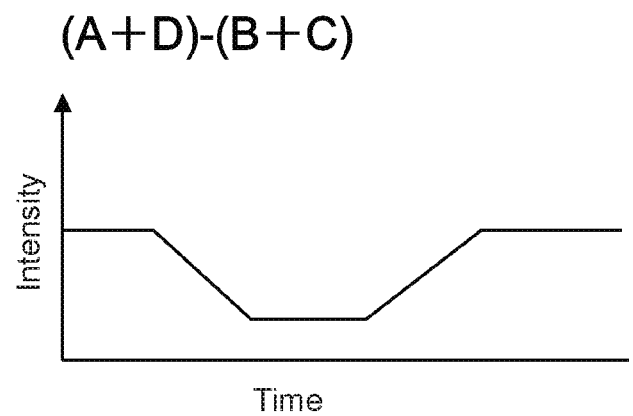
Figure 10A:
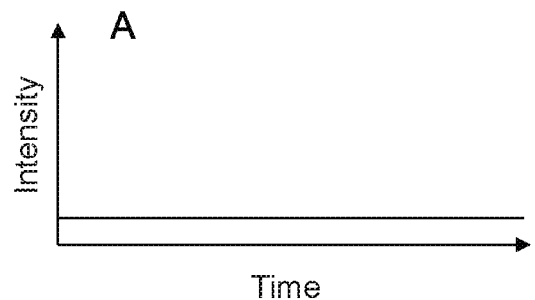
FIGS. 10A to 10D include graphs of when the signal strengths of the receiving antennas included in the millimeter wave radar are binarized.
Figure 10B:
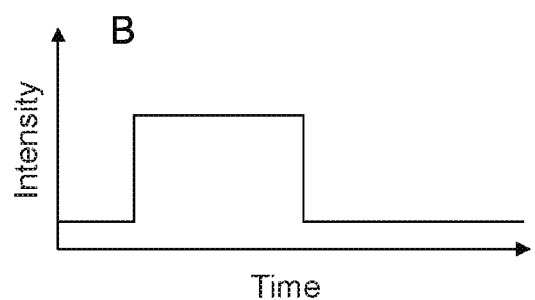
Figure 10C:
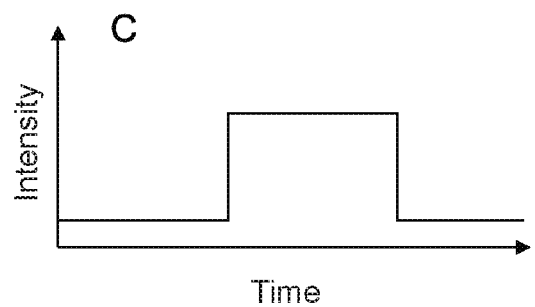
Figure 10D:
Figure 11A:
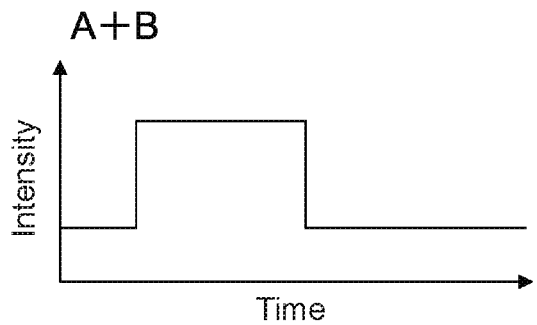
FIGS. 11A to 11D include graphs of when the signal strengths of the receiving antennas included in the millimeter wave radar are combined and then binarized.
Figure 11B:
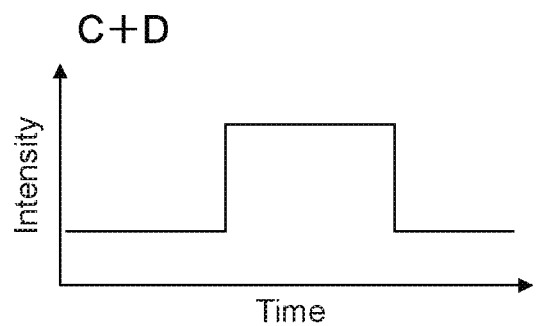
Figure 11C:
Figure 11D:
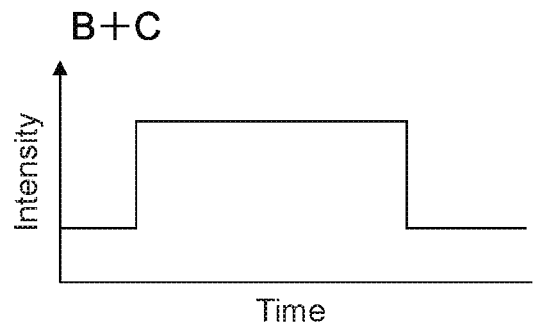
Figure 12A:
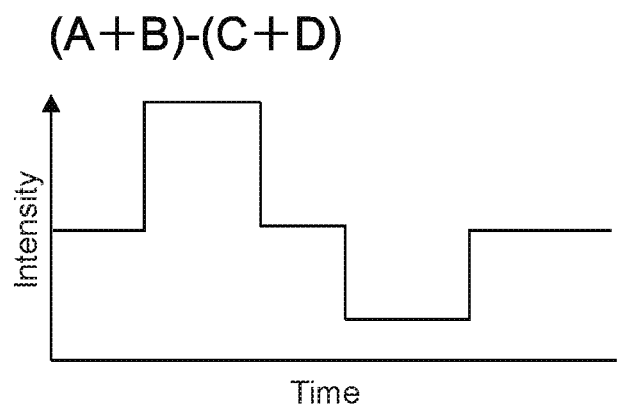
FIGS. 12A and 12B include graphs of when the signal strengths of the receiving antennas included in the millimeter wave radar are combined and then differences are calculated and binarized.
Figure 12B:
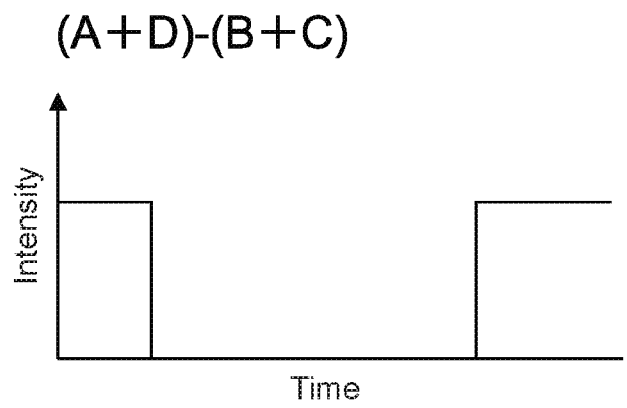
Figure 13A:
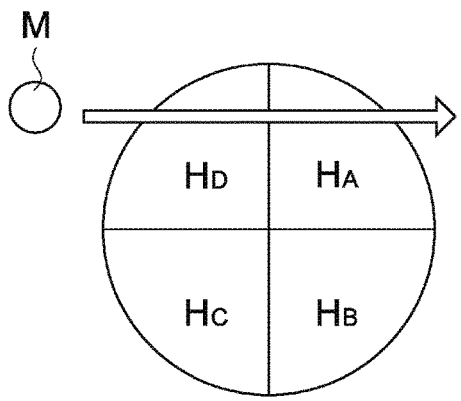
FIGS. 13A to 13C schematically illustrate reception ranges of the receiving antennas included in the millimeter wave radar and a movement path of a moving object and also includes graphs showing the effects on the signal strengths of the receiving antennas.
Figure 13B:
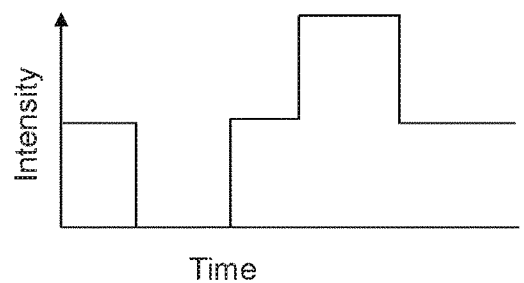
Figure 13C:
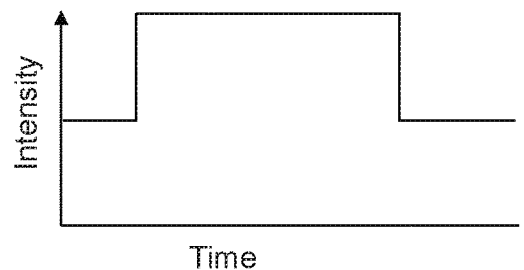
Figure 14A:
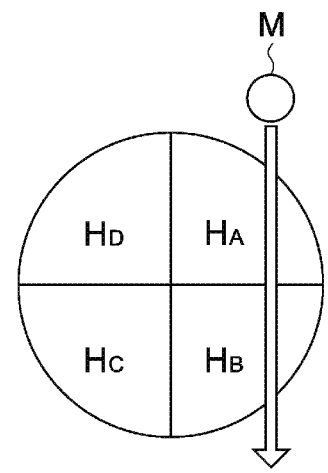
FIGS. 14A to 14C schematically illustrate reception ranges of the receiving antennas included in the millimeter wave radar and a movement path of a moving object and also includes graphs showing the effects on the signal strengths of the receiving antennas.
Figure 14B:
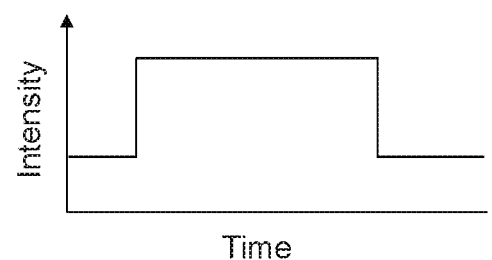
Figure 14C:
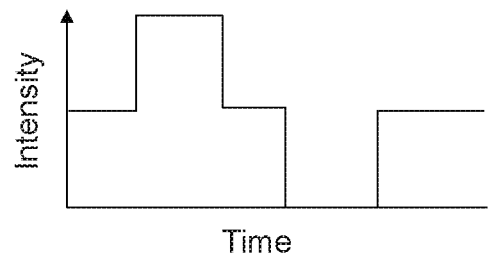
Figure 15A:
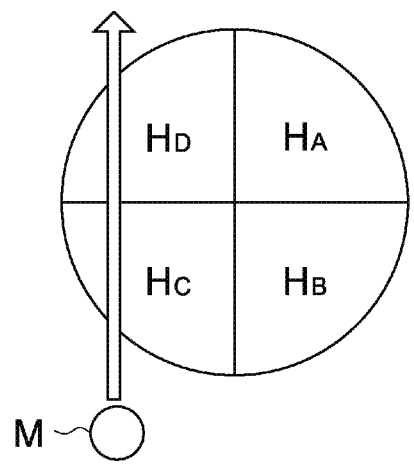
FIGS. 15A to 15C schematically illustrate reception ranges of the receiving antennas included in the millimeter wave radar and a movement path of a moving object and also includes graphs showing the effects on the signal strengths of the receiving antennas.
Figure 15B:
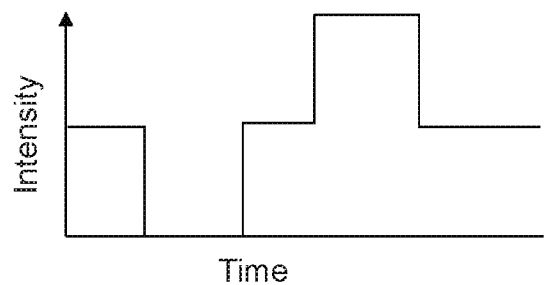
Figure 15C:
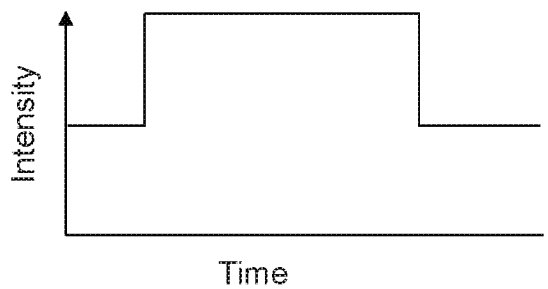

Furthermore, as illustrated in FIGS. 9A and 9B, the processor 121 calculates the difference between the sum of the signal strengths of the receiving antenna 112A and the receiving antenna 112B and the sum of the signal strengths of the receiving antenna 112C and the receiving antenna 112D ((A+B)-(C+D) in the figure), as well as the difference between the sum of the signal strengths of the receiving antenna 112A and the receiving antenna 112D and the sum of the signal strengths of the receiving antenna 112B and the receiving antenna 112C ((A+D)-(B+C) in the figure).

In addition, the processor 121 respectively binarizes the signal strengths of the receiving antennas 112 as well as the signal strength sums and the differences between the signal strength sums described above. FIGS. 10A-D to 12A-B illustrate the binarization results. The processor 121 implements this binarization to make it possible to detect the movement of the moving object M.

FIGS. 13A-C to FIGS. 15A-C schematically illustrate various types of movement of the moving object M and also include graphs showing the results of binarizing the associated differences in signal strengths. When the moving object M moves as illustrated in A in each set of figures, the differences in the sums of the signal strengths take the forms shown in B and C in the figure set. Therefore, the movement direction and speed of the moving object M can be inferred from these combinations of signal strengths.

Figure 16A:
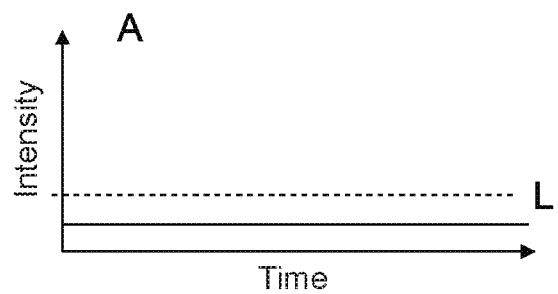
FIGS. 16A to 16D include graphs showing the signal strengths of receiving antennas included in the millimeter wave radar and a threshold value.
Figure 16B:
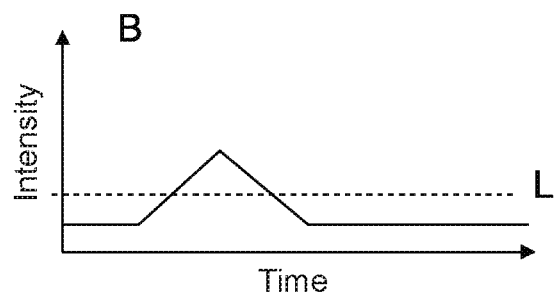
Figure 16C:
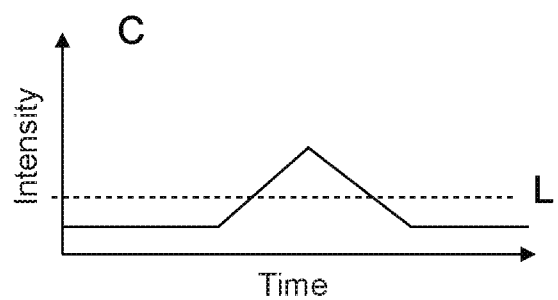
Figure 16D:
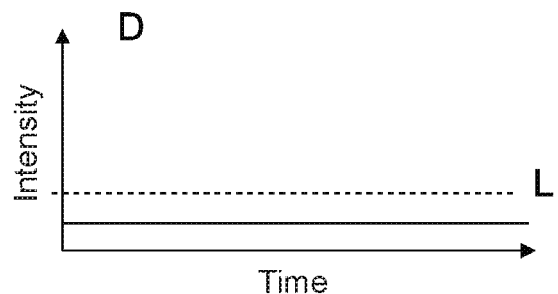

Next, the processor 121 detects the effects (disturbance) due to the moving object M from the signal strengths of the respective receiving antennas 112. FIGS. 16A to 16D include graphs showing the signal strengths of the receiving antennas 112 as well as a threshold value L. As illustrated in FIGS. 16A to 16D, the processor 121 compares the signal strength of each of the receiving antennas 112 to the threshold value L. In FIGS. 16B and 16C, the signal strengths of the receiving antenna 112B and the receiving antenna 112C exceed the threshold value L, which means that these antennas receive millimeter waves RW that have been reflected by the moving object M. In this way, the processor 121 determines that disturbance is present when the signal strength of any one of the receiving antennas 112 exceeds the threshold value L and determines that no disturbance is present when the signal strength of each of the receiving antennas 112 is less than or equal to the threshold value L.

If no disturbance is present (No in St105), the processor 121 adopts the measured distances between the receiving antenna 112 and the measurement target as distances between the receiving antennas 112 and the target T (St106). Meanwhile, if disturbance is present (Yes in St105), the processor 121 rejects the measured distances between the receiving antennas 112 and the measurement target due to this measured distance having been affected by the moving object M (St107).

The millimeter wave radar 100 operates as described above. As described above, the millimeter wave radar 100 can reject disturbance caused by a moving object by detecting the moving object in a simple manner, and the millimeter wave radar 100 can also be used as a simple moving object sensor.

<Separator>

The millimeter wave radar 100 may further include a separator arranged on the transmitting antenna 111. FIGS. 17A-17B to 19A-19B schematically illustrate a transmitting antenna 111 that includes a separator 113. "A" in each figure set is a view from a direction orthogonal to the transmission direction of the millimeter wave W, and B in each figure set is a view from the transmission direction of the millimeter wave W.

Figure 17A:
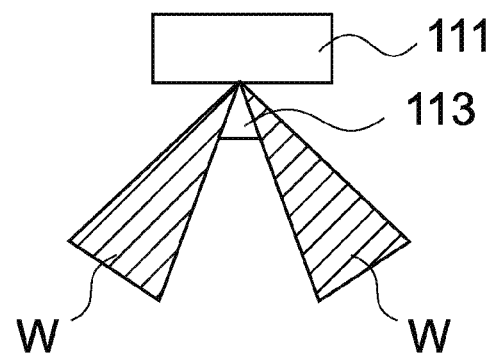
FIGS. 17A and 17B schematically illustrate a transmitting antenna and a separator included in the millimeter wave radar.
Figure 17B:
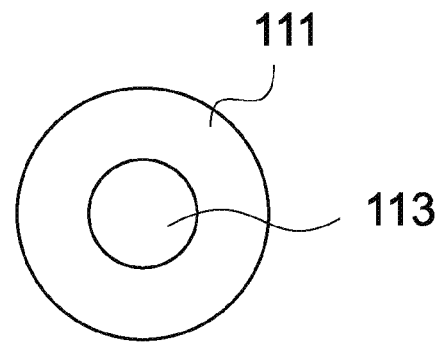
Figure 18A:
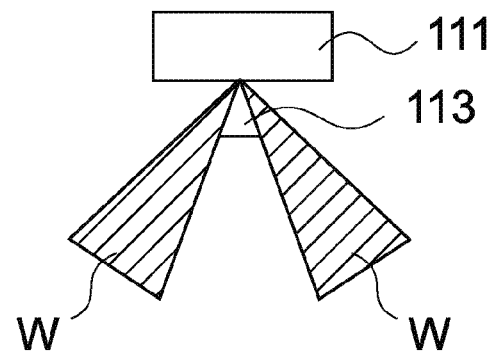
FIGS. 18A and 18B schematically illustrate a transmitting antenna and a separator included in the millimeter wave radar.
Figure 18B:
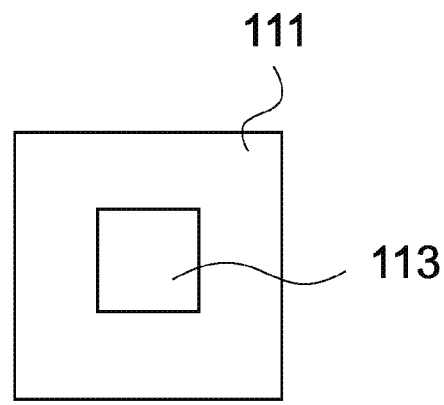
Figure 19A:
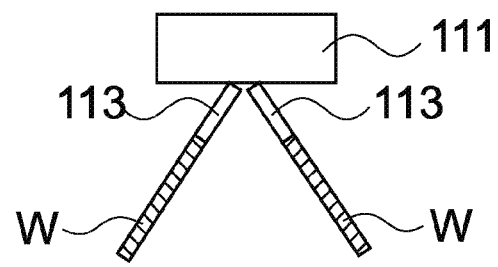
FIGS. 19A and 19B schematically illustrate a transmitting antenna and a separator included in the millimeter wave radar.
Figure 19B:
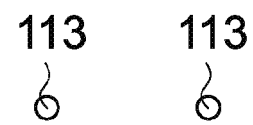
Figure 19B:

The separator 113 is made of a material that blocks millimeter waves and may have a conical shape as illustrated in FIGS. 17A and 17B or may have a quadrangular pyramid shape as illustrated in FIGS. 18A and 18B. Moreover, the separator 113 may have a tubular shape as illustrated in FIGS. 19A and 19B.

Figure 20A:
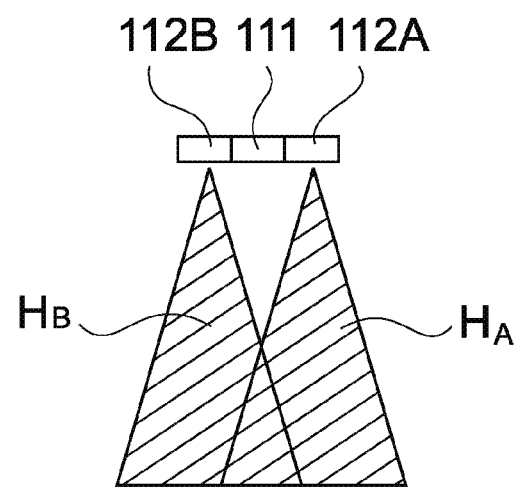
FIGS. 20A to 20C are schematic drawings illustrating the effects of a separator included in the millimeter wave radar.

FIGS. 20A to 22C schematically illustrate the effects of the separator 113. FIG. 20A illustrates the reception range $H_A$ of the receiving antenna 112A and the reception range $H_B$ of the receiving antenna 112B in a state in which the separator 113 is not provided. The reception ranges of the receiving antenna 112C and the receiving antenna 112D are not depicted.

Figure 20B:
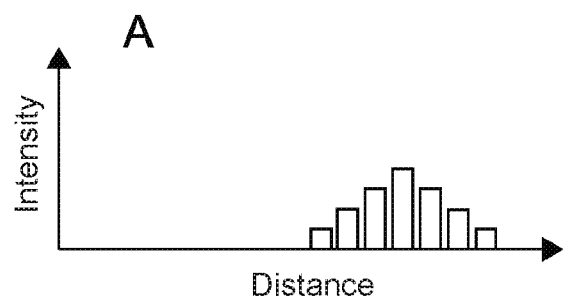
Figure 20C:
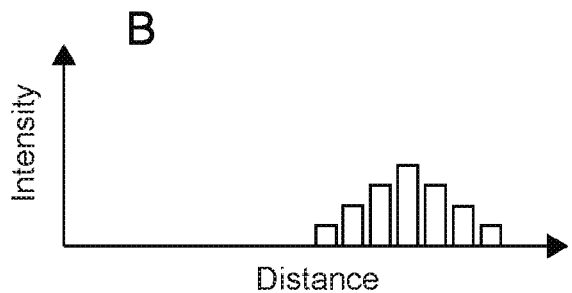

The signal strength relative to distance of the receiving antenna 112A illustrated in FIG. 20B is the same as the signal strength relative to distance of the receiving antenna 112B illustrated in FIG. 20C.

Figure 21A:
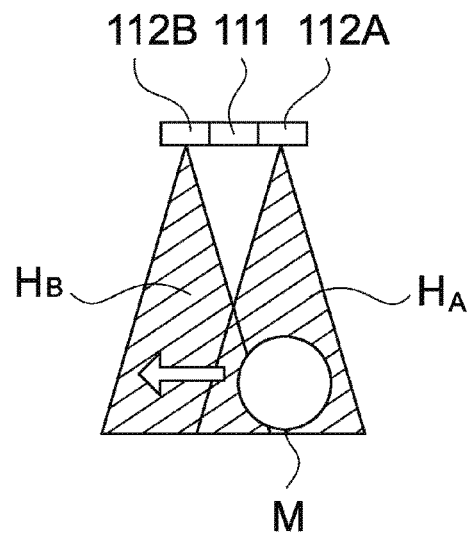
FIGS. 21A to 21C are schematic drawings illustrating the effects of a separator included in the millimeter wave radar.
Figure 21B:
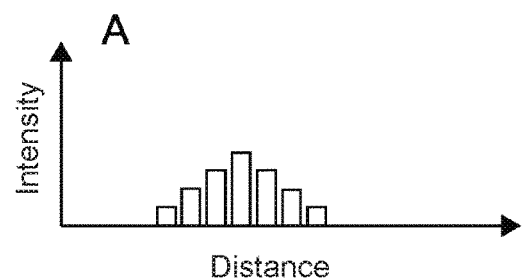
Figure 21C:
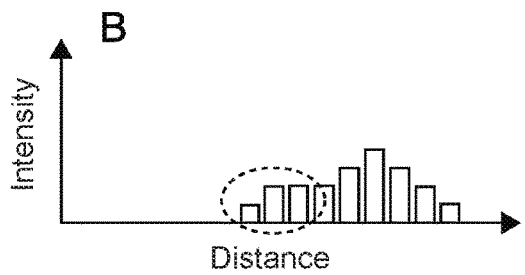

When the moving object M enters the reception range $H_A$ as illustrated in FIG. 21A, the peak in signal strength relative to distance of the receiving antenna 112A gets closer to the receiving antenna 112A, as illustrated in FIG. 21B. Moreover, as illustrated in FIG. 21C, interference disturbance (dashed line in the figure) occurs in the signal strength relative to distance of the receiving antenna 112B. This is because the reception range $H_A$ and the reception range $H_B$ overlap by a certain amount, and the reflected waves caused by the moving object M also reach the receiving antenna 112B.

Figure 22A:
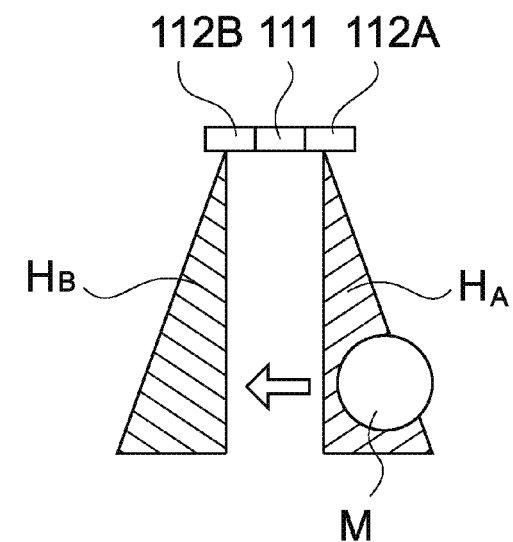
FIGS. 22A to 22C are schematic drawings illustrating the effects of a separator included in the millimeter wave radar.
Figure 22B:
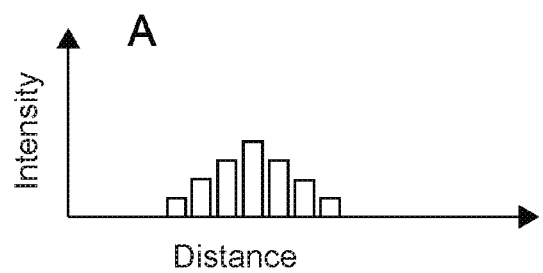
Figure 22C:
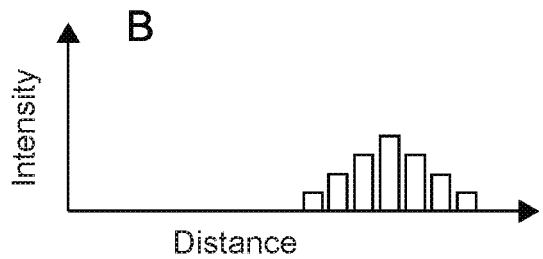

FIG. 22A illustrates the reception range $H_A$ of the receiving antenna 112A and the reception range $H_B$ of the receiving antenna 112B in a state in which the separator 113 is provided. As illustrated in FIG. 22B, when the moving object M enters the reception range $H_A$, the peak in signal strength relative to distance of the receiving antenna 112A gets closer to the receiving antenna 112A. Meanwhile, as illustrated in FIG. 22C, no effects due to the moving object M occur in the signal strength relative to distance of the receiving antenna 112B. This is because the reception range $H_A$ and the reception range $H_B$ are separated by the separator 113, and the reflected waves caused by the moving object M do not reach the receiving antenna 112B.

In this way, the separator 113 eliminates overlap between the reception ranges, thereby making it possible to improve the accuracy of detecting the moving object M. Moreover, although the description above focused on the receiving antenna 112A and the receiving antenna 112B, the reception ranges of the receiving antenna 112C and the receiving antenna 112D can be separated by the separator 113 in a similar manner.

<Number of Receiving Antennas>

Figure 23:
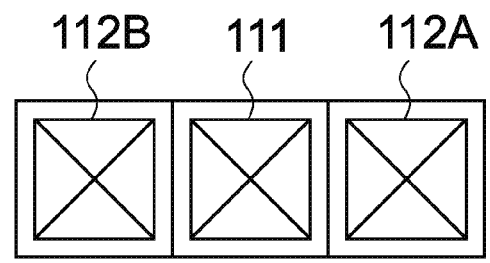
FIG. 23 schematically illustrates a variation of the antenna unit included in the millimeter wave radar.
Figure 24:
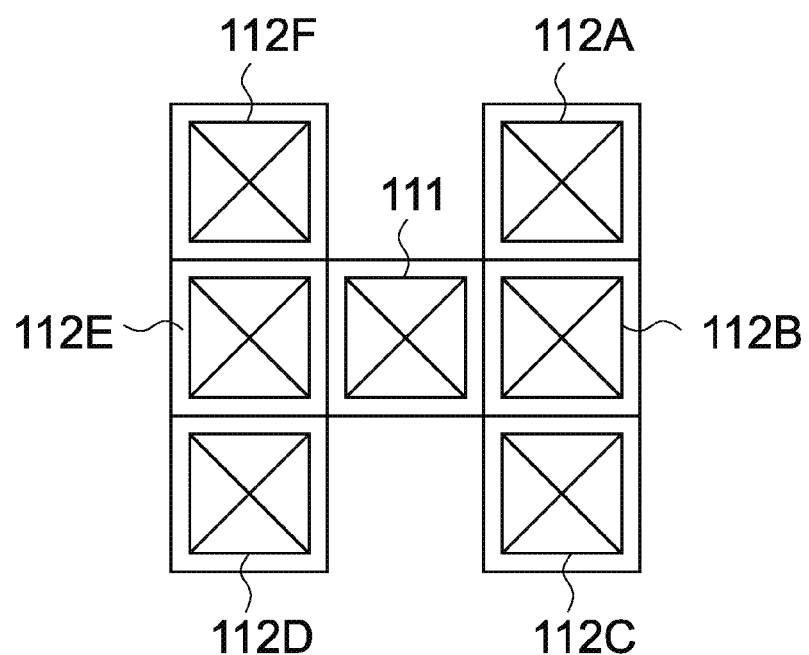
FIG. 24 schematically illustrates a variation of the antenna unit included in the millimeter wave radar.

Although the millimeter wave radar 100 described above includes four of the receiving antennas 112, the number of the receiving antennas 112 included in the millimeter wave radar 100 is not limited to four. The millimeter wave radar 100 may include two of the receiving antennas 112 (112A and 112B) as illustrated in FIG. 23, or may include six of the receiving antennas 112 (112A to 112F) as illustrated in FIG. 24. The number and arrangement of the receiving antennas 112 can be modified as appropriate in accordance with the intended usage of the millimeter wave radar 100.

In addition, the millimeter wave radar 100 can be configured to include two or more of the receiving antennas 112. Although the arrangement of the receiving antennas 112 is not particularly limited, arrangements in which the transmitting antenna 111 is at the center are preferable.

<Transmitting-Receiving Antenna>

Figure 25:
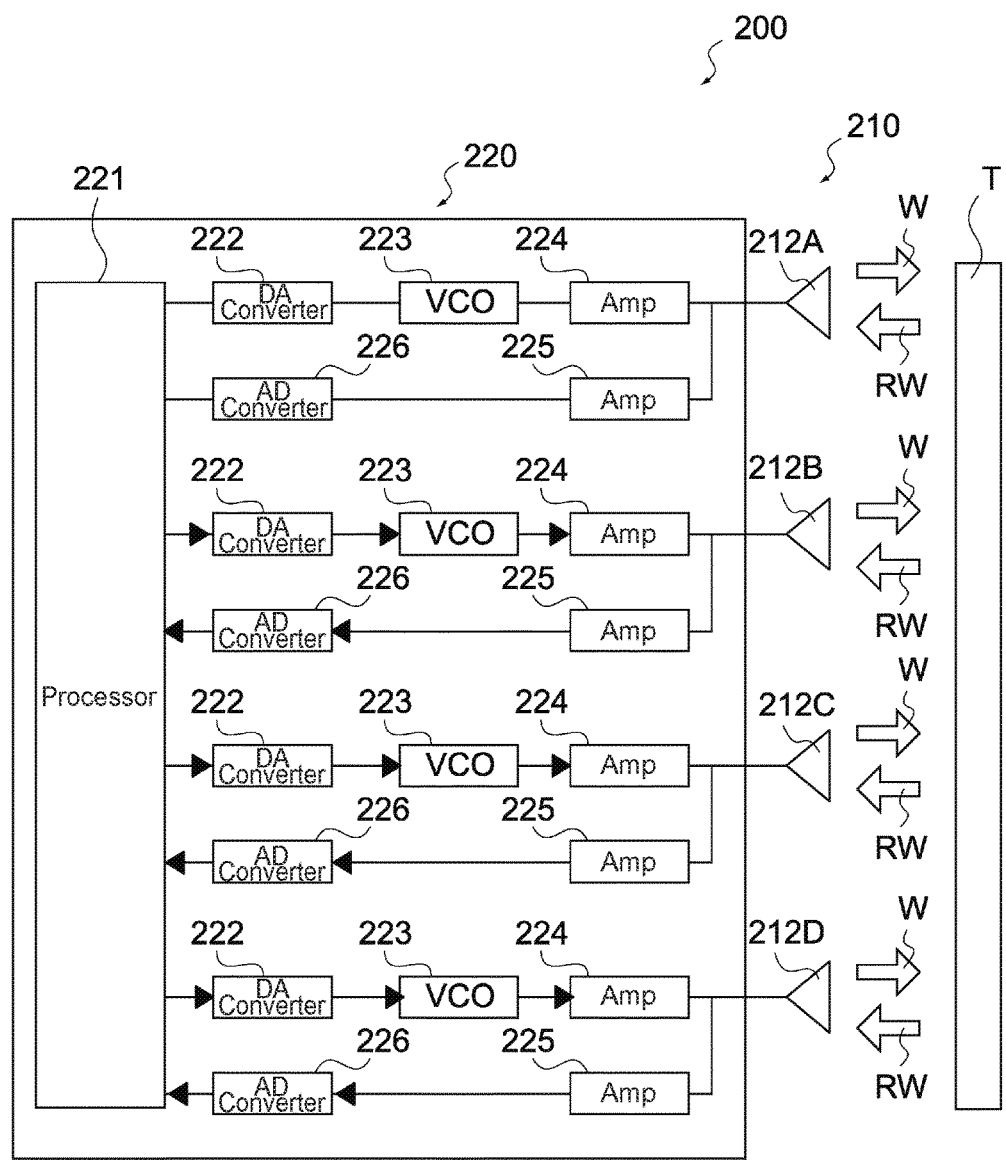
FIG. 25 is a block diagram illustrating a configuration of a millimeter wave radar that includes transmitting-receiving antennas.

Although the millimeter wave radar 100 described above includes one transmitting antenna 111 and four receiving antennas 112, a transmitting-receiving antenna capable of both transmitting and receiving millimeter waves may be included instead of these antennas. FIG. 25 is a block diagram of a millimeter wave radar 200 that includes transmitting-receiving antennas.

As illustrated in FIG. 25, the millimeter wave radar 200 includes an antenna unit 210 and a signal processing unit 220. FIG. 25 also depicts a target T, which is the measurement target for the millimeter wave radar 200.

The antenna unit 210 includes four transmitting-receiving antennas 212. Below, the four transmitting-receiving antennas (collectively referred to by a single reference numeral 212) will be respectively referred to as a transmitting-receiving antenna 212A, a transmitting-receiving antenna 212B, a transmitting-receiving antenna 212C, and a transmitting-receiving antenna 212D.

The transmitting-receiving antennas 212 are antennas capable of transmitting and receiving millimeter waves. FIG. 25 illustrates millimeter waves W that are transmitted from the transmitting-receiving antennas 212 as well as millimeter waves RW that are received by the transmitting-receiving antennas 212. Although the configuration of the transmitting-receiving antennas 212 is not particularly limited, the configuration can be an antenna array in which antenna elements are arranged in an array. Moreover, the transmitting-receiving antennas 212 may include lenses that focus the millimeter waves.

Figure 26:
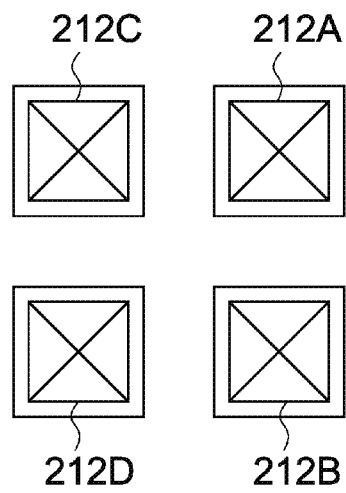
FIG. 26 schematically illustrates an antenna unit included in the millimeter wave radar.

FIG. 26 schematically illustrates the arrangement of the transmitting-receiving antennas 212 in the antenna unit 210 and illustrates the antenna unit 210 as viewed from the target T direction. As illustrated in FIG. 26, the four transmitting-receiving antennas 212 are arranged into two rows and two columns.

The signal processing unit 220 includes a processor 221, four DA converters 222, four VCOs 223, four transmission amplifiers 224, four reception amplifiers 225, and four AD converters 226.

The processor 221 is a microprocessor such as a central processing unit (CPU) which generates transmission signals to be transmitted from the transmitting-receiving antennas 212 and also performs signal processing on received signals that are received by the transmitting-receiving antennas 212.

The DA (digital-to-analog) converters 222 convert the transmission signals output from the processor 221 (which are digital signals) to analog signals and supply these analog signals to the VCOs 223. The four DA converters 222 are respectively connected to the processor 221.

The VCOs (voltage-controlled oscillators) 223 receive the transmission signals supplied from the DA converters 222 and output and supply high-frequency signals in a prescribed frequency (such as 30 GHz) band to the transmission amplifiers 224. The four VCOs 223 are respectively connected to the four DA converters 222 in a one-to-one manner.

The transmission amplifiers 224 amplify the transmission signals supplied from the VCOs 223 to a level necessary for transmission output and respectively supply the resulting signals to the four transmitting-receiving antennas 212. The transmission amplifiers 224 are respectively connected to the four VCOs 223 in a one-to-one manner.

The reception amplifiers 225 amplify the received signals output by the transmitting-receiving antennas 212 upon receiving the millimeter waves RW and supply the resulting signals to the AD converters 226. The four reception amplifiers 225 are respectively connected to the four transmitting-receiving antennas 212 in a one-to-one manner.

The AD (analog-to-digital) converters 226 convert the received signals supplied from the reception amplifiers 225 to digital signals and supply these digital signals to the processor 221. The four AD converters are respectively connected to the four reception amplifiers 225 in a one-to-one manner and are also connected to the processor 221.

The millimeter wave radar 200 has the configuration described above. The millimeter wave radar 200 operates in the same manner as the millimeter wave radar 100. In other words, the millimeter wave radar 200 can easily detect a moving object and can therefore reject disturbance due to the moving object, and the millimeter wave radar 200 can also be used as a simple moving object sensor.

Note that the number of the transmitting-receiving antennas 212 is not limited to four and can be set to two or greater. Moreover, as described above, the transmitting-receiving antennas 212 may include separators for separating the reception ranges of the transmitting-receiving antennas 212 from one another.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A millimeter wave radar, comprising:
   an antenna unit including a plurality of antennas that receive millimeter waves, each of the antennas having a prescribed reception range from which the millimeter waves are incident on the antenna; and
   a signal processing unit that detects, on the basis of a difference between outputs of the plurality of antennas that have received millimeter waves, a moving object moving across the reception ranges of the plurality of antennas,
   wherein the respective prescribed reception ranges for the plurality of antennas are provided for detecting a measurement target object, and the signal processing unit is configured to detect the measurement target object from the outputs of the plurality of antennas, and
   wherein when an output of any of the plurality of antennas exceeds a prescribed threshold value, the signal processing unit determines that the moving object is in front of the measurement target object and rejects a result of the detection of the measurement target object.

2. The millimeter wave radar according to claim 1, wherein the signal processing unit estimates a movement direction or a movement speed of the moving object on the basis of the difference between the outputs of the plurality of antennas.

3. The millimeter wave radar according to claim 2,
   wherein the plurality of antennas includes four antennas, and
   wherein the signal processing unit estimates the movement direction or the movement speed of the moving object on the basis of a difference between a sum of outputs of two antennas of the four antennas and a sum of outputs of two other antennas.

4. The millimeter wave radar according to claim 1, further comprising:

a transmission antenna that transmits millimeter waves, wherein the plurality of antennas are arranged with the transmitting antenna at a center.

5. The millimeter wave radar according to claim 4, further comprising:
a separator that is arranged on the transmitting antenna so as to separate the reception ranges of the plurality of antennas from one another without overlaps therebetween.

6. The millimeter wave radar according to claim 1, wherein the plurality of antennas are transmitting-receiving antennas that respectively transmit millimeter waves.

7. The millimeter wave radar according to claim 6, further comprising:
separators that are arranged on the transmitting-receiving antennas so as to separate reception ranges of the transmitting-receiving antennas from one another without overlaps therebetween.

8. A millimeter wave radar detection method, comprising:
receiving, via a plurality of antennas, millimeter waves reflected from a measurement target object and a moving object that moves across prescribed reception ranges of the plurality of antennas, the respective prescribed reception ranges being defined as ranges from which millimeter waves reflected from the measurement target object are incident on the respective antennas; and
detecting, on the basis of a difference between outputs of the plurality of antennas that receive millimeter waves, the moving object moving across the reception ranges of the plurality of antennas,
wherein the respective prescribed reception ranges for the plurality of antennas are provided for detecting the measurement target object, and the method further comprises detecting the measurement target object from the outputs of the plurality of antennas, and
wherein the method further comprises, when an output of any of the plurality of antennas exceeds a prescribed threshold value, determining that the moving object is in front of the measurement target object and rejecting a result of the detection of the measurement target object.

9. A millimeter wave radar, comprising:
an antenna unit including a plurality of antennas that receive millimeter waves reflected from a measurement target object and a moving object that moves across reception ranges of the plurality of antennas, the reception ranges being defined as ranges from which millimeter waves reflected from the measurement target object are incident on the respective antennas; and
a signal processing unit that detects the measurement target object in accordance with outputs of the plurality of antennas that have received millimeter waves reflected from the measurement target object, the signal processing unit further determining whether the moving object is moving across the reception ranges of the plurality of antennas, and if so determined, rejecting a result of the detection of the measurement target object.

10. The millimeter wave radar according to claim 9, wherein the reception ranges of the plurality of antennas are set so that there is no overlap among the reception ranges.

11. The millimeter wave radar according to claim 9, wherein when the moving object is moving across the reception ranges of the plurality of antennas, the processing unit determines, on the basis of a difference between the outputs of the plurality of antennas that have received millimeter waves, a movement direction or movement speed, or both, of the moving object.

12. The millimeter wave radar according to claim 9, wherein the signal processing unit determines that the moving object is moving across the reception ranges of the plurality of antennas and rejects the result of the detection of the measurement target object, when an output of any of the plurality of antennas exceeds a prescribed threshold value.

* * * * *